(12) United States Patent
Akiba

(10) Patent No.: US 7,987,317 B2
(45) Date of Patent: Jul. 26, 2011

(54) DATA RECORDING DEVICE AND CONTROL METHOD OF SAME

(76) Inventor: Kazuhiko Akiba, Kanagawa (JP)

( * ) Notice: Subject to any disclaimer, the term of this patent is extended or adjusted under 35 U.S.C. 154(b) by 621 days.

(21) Appl. No.: 12/006,641

(22) Filed: Jan. 4, 2008

(65) Prior Publication Data

US 2008/0186609 A1 Aug. 7, 2008

(30) Foreign Application Priority Data

Jan. 5, 2007 (JP) ................................ 2007-000372

(51) Int. Cl.
*G06F 12/00* (2006.01)
(52) U.S. Cl. ........................................ 711/112; 711/154
(58) Field of Classification Search .................. 711/112, 711/154
See application file for complete search history.

(56) References Cited

U.S. PATENT DOCUMENTS

| | | | |
|---|---|---|---|
| 5,493,676 A * | 2/1996 | Amundson | 714/42 |
| 7,174,478 B2 * | 2/2007 | Asano | 714/8 |
| 2002/0083779 A1 * | 7/2002 | Narita et al. | 73/862.191 |
| 2003/0081337 A1 | 5/2003 | Tanimoto | |
| 2004/0042105 A1 | 3/2004 | Cho | |
| 2006/0193225 A1 * | 8/2006 | Kon et al. | 369/53.45 |
| 2006/0206681 A1 * | 9/2006 | Suzuki et al. | 711/170 |

\* cited by examiner

*Primary Examiner* — Hasheem Farrokh

(57) ABSTRACT

Embodiments of the present invention provide a data recording device that allows swift data access even under the state that data access is difficult, and a control method for the device. According to one embodiment, when receiving a data reading command from an external host in the state that a reading-difficult state is being detected, a Microprocessing Unit/Hard Disk Controller (MPU/HDC) of a magnetic disk device reads data related to the reading command from a magnetic disk for transmission to an external host and recording into a memory. Thereafter, when receiving another reading command from the external host for the same data, the data is read from the memory for transmission to the external host.

12 Claims, 4 Drawing Sheets

DATA RECORDING DEVICE AND CONTROL METHOD OF SAME

CROSS-REFERENCE TO RELATED APPLICATION

The instant nonprovisional patent application claims priority to Japanese Patent Application No. 2007-000372 filed Jan. 5, 2007 and which is incorporated by reference in its entirety herein for all purposes.

BACKGROUND OF THE INVENTION

In recent years, a data recording device such as hard disk drive has been reduced in size, and there has been a growth in the use thereof in devices other than personal computers. For example, a data recording device is often used in the field of in-vehicle equipment such as a navigation device equipped with a hard disk drive recorded with cartographic data.

When a data recording device is equipped to in-vehicle equipment or others, the device is likely to be exposed under the severe environment, e.g., under the temperature environment not in the operation assurance range in cold and hot climates, and under the vibration environment while the vehicle is running. If this is the case, in the data recording device, data reading takes time or data writing suffers from trouble, thereby resulting in a difficulty of data access.

BRIEF SUMMARY OF THE INVENTION

Embodiments in accordance with the present invention provide a data recording device that enables swift data access even under the state that data access is difficult, and a control method for the device. According to the particular embodiment disclosed in FIG. 1, when receiving a data reading command from an external host in the state that a reading-difficult state is being detected, a Microprocessing Unit/Hard Disk Controller (MPU/HDC) 21 of a magnetic disk device 1 reads data related to the reading command from a magnetic disk 11 for transmission to an external host and recording into a memory 44. Thereafter, when receiving another reading command from the external host for the same data, the data is read from the memory 44 for transmission to the external host.

DETAILED DESCRIPTION OF THE INVENTION

Figure 1:
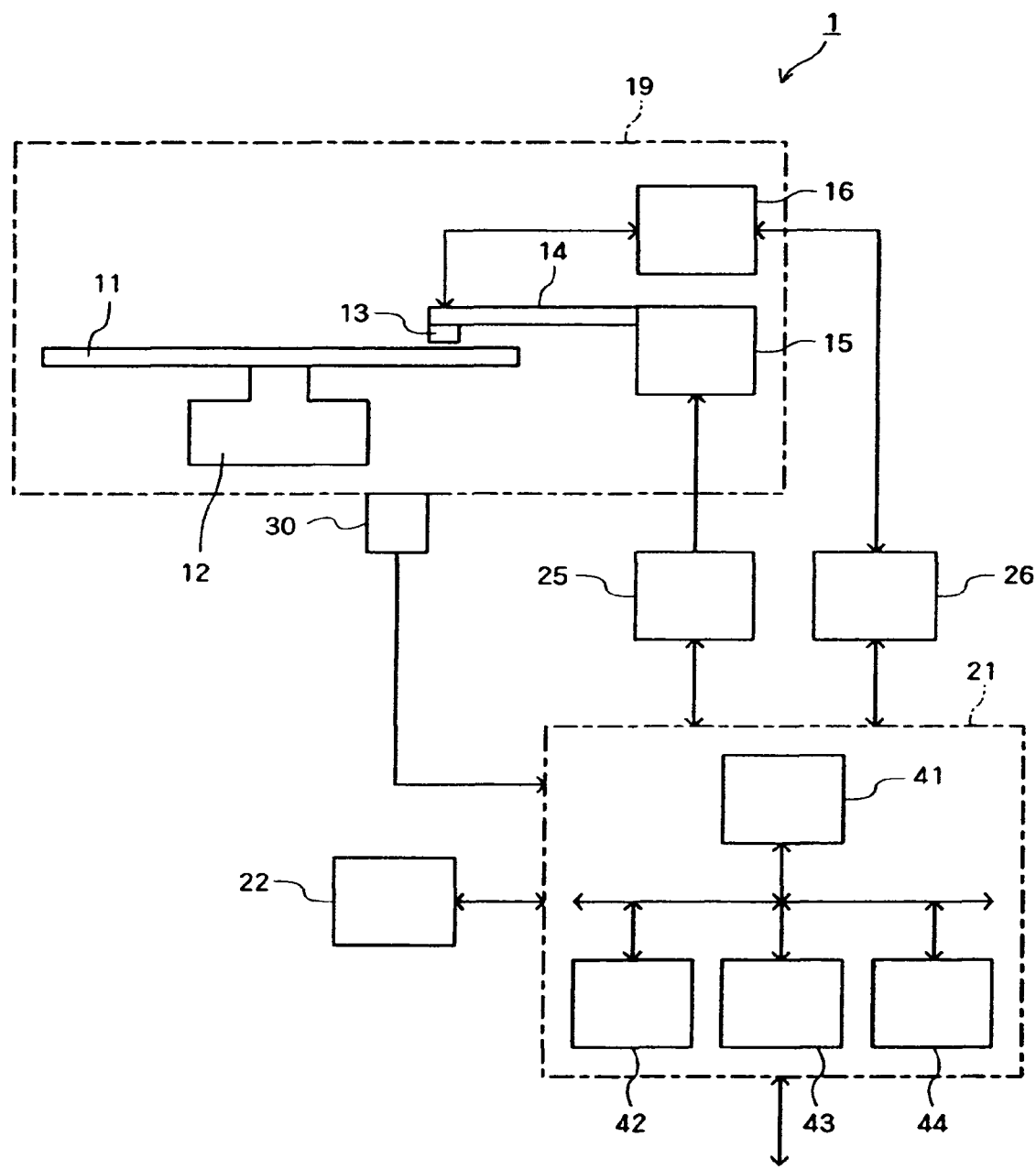
FIG. 1 is a block diagram showing an exemplary configuration of a data recording device.

Embodiments of the present invention relate to a data recording device and a control method therefor.

Embodiments of the present invention are proposed in consideration of the problems as such, and one object thereof is to provide a data recording device that enables swift data access even under the state that data access is difficult, and a control method for the device.

In order to achieve the object described above, a data recording device of embodiments of the present invention is characterized by including: a main recording medium for recording of data; an auxiliary recording medium provided separately from the main recording medium; a detection circuit that detects a reading-difficult state in which the reading of the data from the main recording medium takes a predetermined length of time or longer; and a control circuit that reads, when the reading-difficult state is being detected, data related to a reading command from the main recording medium for transmission and recording to the auxiliary recording medium, and then when receiving another reading command for the same data, reads the data recorded on the auxiliary recording medium for transmission.

Moreover, the data recording device according to embodiments of the present invention is characterized by further including a temperature sensor that detects a device temperature of the data recording device, and the detection means detects a state in which the device temperature detected by the temperature sensor is not satisfying a predetermined temperature range as the reading-difficult state.

Further, in the data recording device according to embodiments of the present invention, characteristically, the detection means detects a state in which a predetermined error is occurring as the reading-difficult state.

Still further, in the data recording device according to embodiments of the present invention, characteristically, the main recording medium is configured by a recording disk, and the auxiliary recording medium is configured by a semiconductor memory.

Still further, in the data recording device according to embodiments of the present invention, characteristically, the detection circuit detects a writing-difficult state in which writing of the data to the main recording device possibly suffers from trouble, and the control circuit records, on the auxiliary recording medium, data related to a writing command in a state that the writing-difficult state is being detected.

Still further, in the data recording device according to embodiments of the present invention, characteristically, the control circuit records, on the main recording medium, the data recorded on the auxiliary recording medium in a state that the writing-difficult state is not detected any more.

Next, a data recording device control method according to embodiments of the present invention is characterized by comprising: a detection step of detecting a reading-difficult state in which reading of data from a main recording medium takes a predetermined length of time or longer; a recording step of reading, when the reading-difficult state is being detected, data related to a reading command from the main recording medium for transmission and for recording on an auxiliary recording medium provided separately from the main recording medium; and a reading step of reading, when the reading-difficult state is being detected, when another reading command is received for the same data after the recording step, the data recorded on the auxiliary recording medium for transmission.

According to embodiments of the present invention, swift data access is enabled even under the state that data access is difficult.

An embodiment of the present invention is described by referring to the accompanying drawings.

In the embodiment described below, the data recording device is exemplified by a magnetic disk device such as a hard disk drive (HDD). This is not restrictive, and any other types of disk device will do, e.g., an optical disk device using an optical disk such as CD-ROM and DVD-ROM.

FIG. 1 is a block diagram showing an exemplary configuration of a magnetic disk device 1 as a data recording device. The magnetic disk device 1 includes, inside of a chassis 19, a magnetic disk 11 as a main recording device, a spindle motor 12, a magnetic head 13, a suspension arm 14, a voice coil motor 15, and a head amplifier 16.

The magnetic disk 11 is configured like a disk, and is magnetically recorded with data on the main surface. The magnetic disk 11 is rotate-driven by being attached to the spindle motor 12.

The magnetic head 13 performs data writing and reading magnetically to/from the magnetic disk 11. The magnetic head 13 is supported at the tip end of the suspension arm 14 attached to the voice coil motor 15. By the suspension arm 14 being spin-driven by the voice coil motor 15, the magnetic head 13 moves on the magnetic disk 11 in substantially the radius direction.

Moreover, the magnetic disk device 1 is provided with, outside of the chassis 19, an MPU/HDC (Microprocessing Unit/Hard Disk Controller) 21 serving as a detection circuit and a control circuit, a buffer memory 22, a driver 25, an R/W channel (Read/Write channel) 26, and a temperature sensor 30.

The buffer memory 22 temporarily stores data to be written into the magnetic disk 11 and the data to be read from the magnetic disk 11.

When a control signal for the voice coil motor 15 is input from the MPU/HDC 21, the driver 25 drives the voice coil motor 15.

When a write signal is input from the MPU/HDC 21 during data writing, the R/W channel 26 subjects it to code modulation for output to the head amplifier 16. When a reading signal is input from the head amplifier 16 during data reading, the R/W channel 26 subjects it to data demodulation for output to the MPU/HDC 21.

When a write signal is input from the R/W channel 26 during data writing, the head amplifier 16 amplifies it for output to the magnetic head 13. Moreover, when a reading signal is input from the magnetic head 13 during data reading, the head amplifier 16 amplifies it for output to the R/W channel 26.

The temperature sensor 30 detects the device temperature of the magnetic disk device 1, and inputs an electric signal indicating the device temperature to the MPU/HDC 21. In this embodiment, the temperature sensor 30 is attached to the outside of the chassis 19, but this is not restrictive, and may be attached inside of the chassis 19 to be able to detect the device temperature at a position closer to the magnetic disk 11.

The MPU/HDC 21 is provided with an HDC (Hard Disk Controller) 41, an MPU (Microprocessing Unit) 42, a RAM (Random Access Memory) 43, and a memory 44 for use as an auxiliary recording medium.

The HDC 41 is provided with an error correction circuit, a buffer control circuit, an interface circuit, a servo circuit, and others.

The MPU 42 takes charge of controlling the entire device, e.g., variously controlling seek control over the magnetic head 13, and interface control with any external host. The RAM 43 operates as a working memory of the MPU 42.

The memory 44 stores therein programs and data needed for the MPU 42 to operate.

This memory 44 is configured by a nonvolatile memory, i.e., semiconductor memory such as flash memory. The memory 44 configured by a semiconductor memory as such has a wider temperature range with which operation can be assured compared with the magnetic disk 11, and has resistance to vibration because not using an actuator for reading and writing. As such, even if it is disposed under the temperature environment not in the operation assurance range of the magnetic disk 11, or under the severe environment such as the vibration environment, the stable reading and writing can be achieved.

During write processing, when a writing-difficult state that will be described later is detected, this memory 44 is recorded with data that is to be written onto the magnetic disk 11 and is related to a writing command. Also, during read processing, when a reading-difficult state that will be described later is detected, the memory 44 is recorded with data that is read from the magnetic disk 11 and is related to a reading command.

Moreover, the memory 44 is recorded with management information such as a threshold value of the temperature range to be used to detect a writing-difficult state and a reading-difficult state that will be both described later, and the retry frequency and time of the seek operation. This management information can be changed by a user.

Described next is the specific operation of the magnetic disk device 1.

During writing processing and reading processing, under any predetermined condition, the magnetic disk device 1 operates to record data related to the processing to the memory 44. Moreover, the magnetic disk device 1 operates to reflect, to the magnetic disk 11, the data recorded in the memory 44 by the writing processing. In the below, these are each described.

Write Processing

Figure 2:
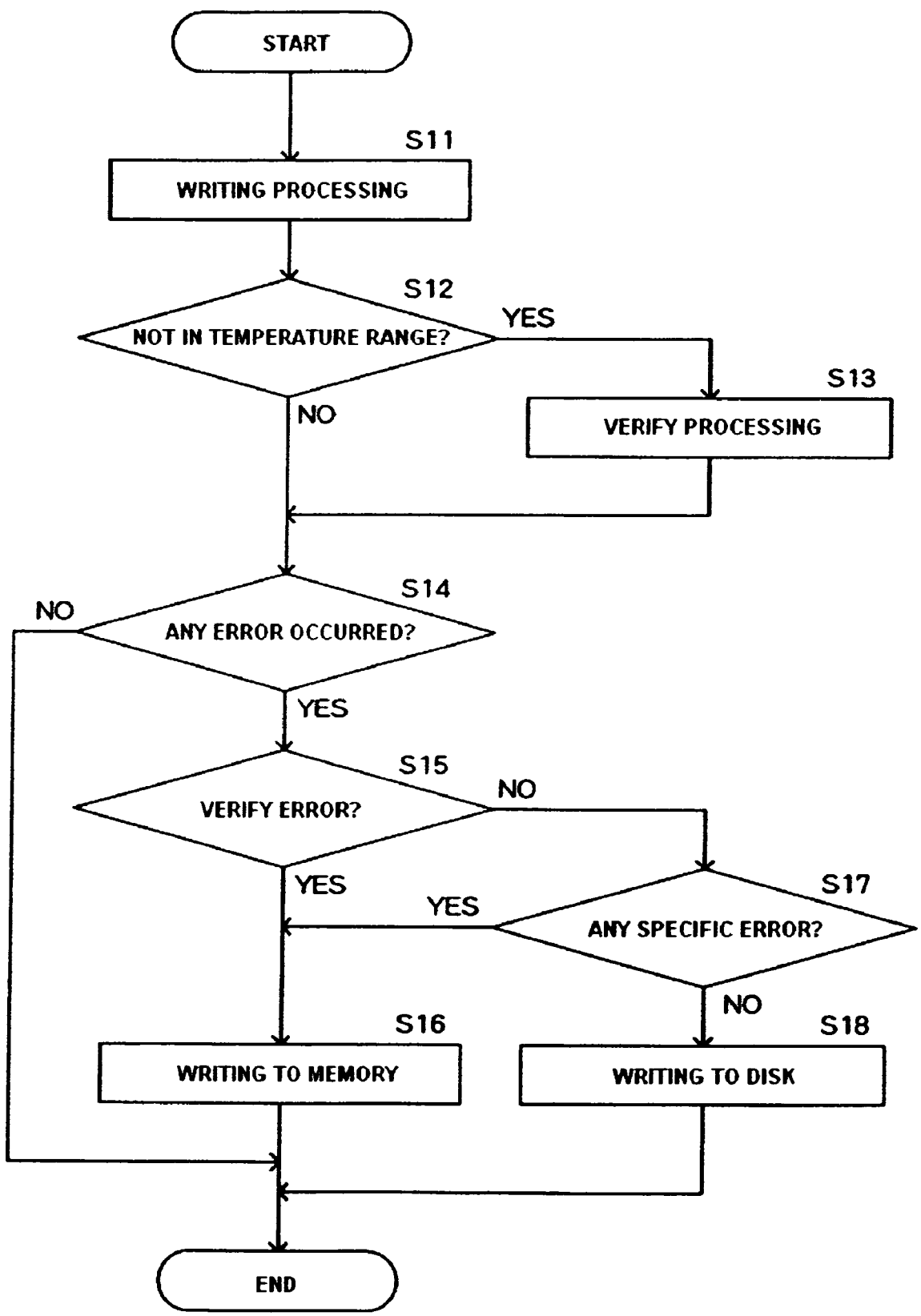
FIG. 2 is a flowchart of the flow of writing processing.

FIG. 2 is a flowchart of the flow of writing processing. When receiving a writing command of data from an external host, the MPU/HDC 21 of the magnetic disk device 1 makes the magnetic head 13 seek the magnetic disk 11 up to its specific position specified by address information included in the writing command, and performs writing processing of writing data related to the writing command to the specific position (S11).

At this time, when detecting the state in which the device temperature detected by the temperature sensor 30 is not satisfying a predetermined temperature range being previously set (S12: YES), the MPU/HDC 21 goes through verify processing to check whether the data is written to the magnetic disk 11 with accuracy (S13).

Herein, the state in which the device temperature is not satisfying the predetermined temperature range previously set is the state in which data writing to the magnetic disk 11 possibly suffers from trouble, i.e., an exemplary writing-difficult state. The predetermined temperature range can be set based on the temperature range with which the operation of the magnetic disk device 1 can be assured. With the temperature lower than the operation assurance range, the coercive force of the magnetic disk 11 is increased, thereby resulting in a difficulty of magnetic data writing. Furthermore, with the temperature higher than the operation assurance range, the thermal expansion of a bearing or others in the spindle motor 12 prevents the magnetic disk 11 from rotating like a perfect circle, thereby resulting in a difficulty of positioning of the magnetic head 13. As a result, the data writing becomes difficult.

The verify processing is processing of, after the magnetic disk 11 is written with data, reading the written data, and comparing the read data with the data before writing. As such, a determination is made whether a bit error is occurring or not, so that the magnetic disk 11 is checked whether the data writing is performed with accuracy.

Next, when some error has occurred as a result of the writing processing (S14: YES), if it is a verify error (S15: YES), the MPU/HDC 21 writes data related to a writing command to the memory 44 because data writing cannot be performed with accuracy with the current device temperature (S16). At this time, the RAM 43 or the memory 44 is recorded with corresponding information indicating that the data related to the writing command is recorded not at the specific position of the magnetic disk 11 specified by the address information found in the writing command, but in a predetermined area of the memory 44.

Note here that the MPU/HDC 21 does not notify the external host that the data related to the writing command has been recorded into the memory 44. After the data related to the writing command is recorded in the memory 44, when a reading command for the data is received from the external host, this data is read from the memory 44 based on the corresponding information for transmission to the external host.

When some error has occurred as a result of the writing processing (S14: YES), even if it is not a verify error (S15: NO) but if it is a specific error (S17: YES), similarly to the above, the MPU/HDC 21 writes the data related to the writing command to the memory 44 (S16). On the other hand, when it is not a specific error (S17: NO), the data related to the writing command is written to the magnetic disk 11 again (S18).

Herein, the specific error may be set as a seek error that is occurred when a predetermined value being previously ready is exceeded by the retry frequency and time of the seek operation. The occurrence of such a specific error can be an example of the writing-difficult state. Retrying the seek operation is to seek the magnetic head 13 again when the positioning of the magnetic head 13 is difficult because a position error signal (PES) is not reduced sufficiently when the magnetic head 13 is subjected to seeking up to any target track position.

As such, when detecting the writing-difficult state during the writing processing, the magnetic disk device 1 records the data related to the writing command to the memory 44 so that the reliability of the data can be assured.

Moreover, without notifying the external host that the data related to the writing command is recorded in the memory 44, when receiving a reading command from the external host for the data, the magnetic disk device 1 reads the data from the memory 44 based on the corresponding information for transmission to the external host so that the load on the side of the external host can be reduced.

Moreover, the magnetic disk device 1 goes through the verify processing when the device temperature does not satisfy any predetermined temperature range, and when a verify error occurs, records the data related to the writing command in the memory 44. In this manner, when the data writing becomes not able to be performed with accuracy in reality, the data related to the writing command can be saved into the memory 44 appropriately.

Reflection Processing

Figure 3:
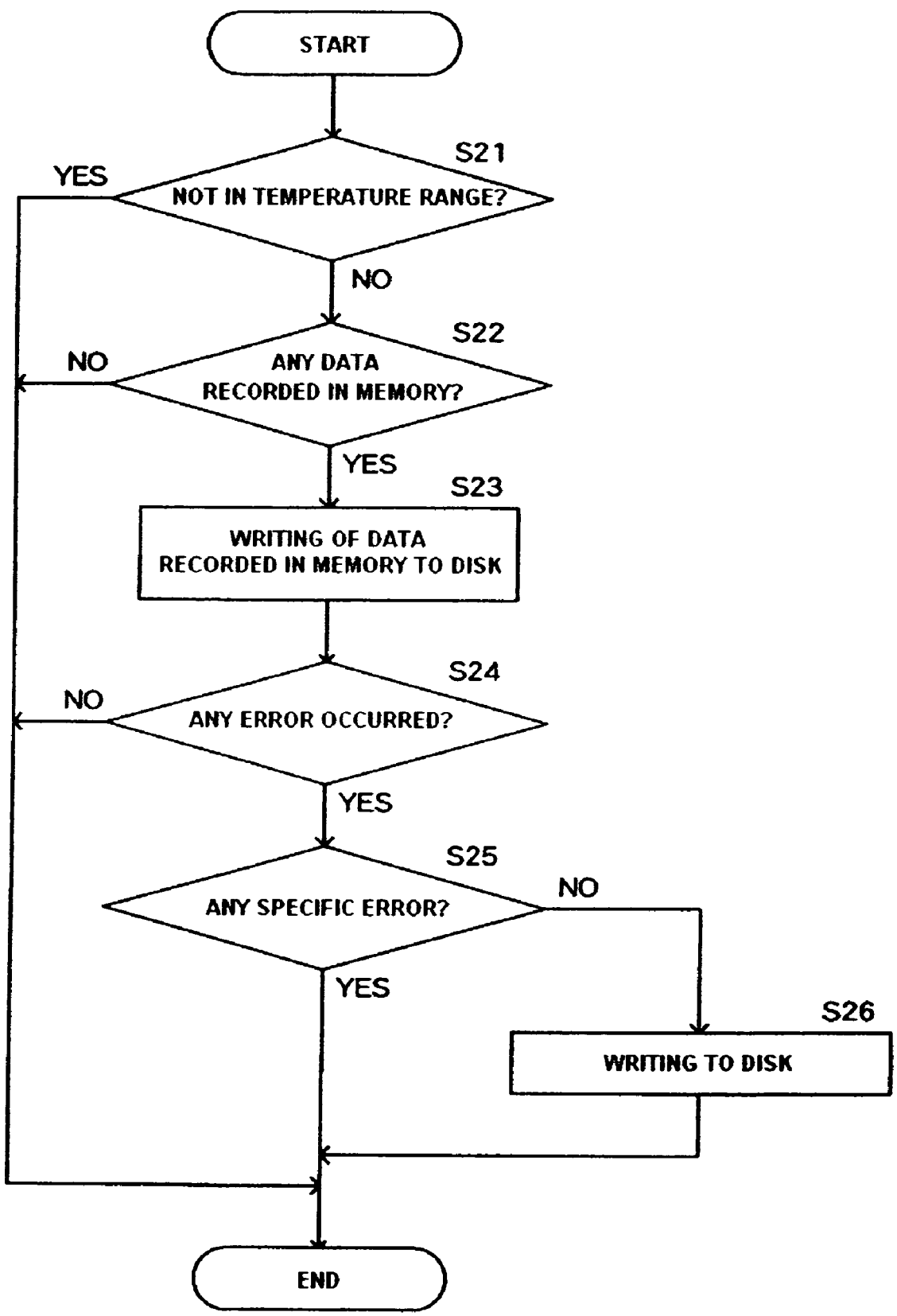
FIG. 3 is a flowchart of the flow of reflection processing.

FIG. 3 is a flowchart of the flow of reflection processing. The MPU/HDC 21 of the magnetic disk device 1 goes through the reflection processing at regular intervals in the state that there is no access by the external host. When the device temperature detected by the temperature sensor 30 is satisfying the temperature range described above (S21: NO), and when the memory 44 is recorded with data (S22: YES), the MPU/HDC 21 reads the data recorded in the memory 44, and subjects the magnetic head 13 to seeking up to the specific position of the magnetic disk 11 specified by the above-described corresponding information. The processing is then performed to write the data read from the memory 44 to the specific position (S23).

When no error occurs as a result of this writing processing (S24: NO), the MPU/HDC 21 updates the above-described corresponding information to details indicating that the data is reflected at the specific position of the magnetic disk 11, and deletes the data reflected to the magnetic disk 11 from the memory 44. This is the end of the reflection processing.

On the other hand, when some error occurs as a result of this writing processing (S24: YES), if it is the above-described specific error (S25: YES), it is the state in which data writing to the magnetic disk 11 may cause some trouble (writing-difficult state). Therefore, with no data deletion from the memory 44 and no update of the corresponding information, the processing is ended. On the other hand, if it is not the specific error (S25: NO), the data read from the memory 44 is written into the magnetic disk 11 again (S26).

As such, with no involvement of the external host, the magnetic disk device 1 voluntarily reads the data from the memory 44 for reflection to the magnetic disk 11. Therefore, the load on the side of the external host can be reduced.

Reading Processing

Figure 4:
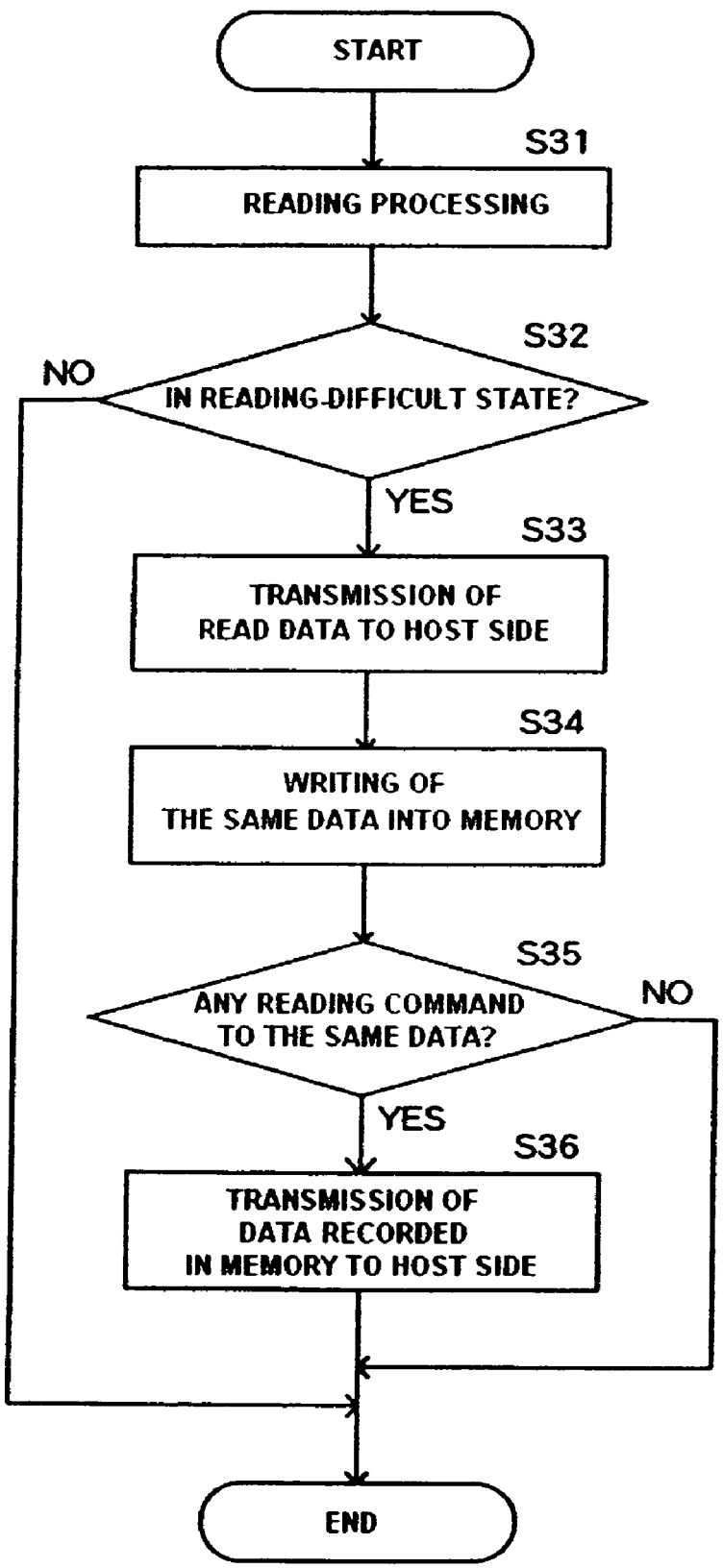
FIG. 4 is a flowchart of the flow of reading processing.

FIG. 4 is a flowchart of the flow of the reading processing. When receiving a reading command of data from the external host, the MPU/HDC 21 of the magnetic disk device 1 makes the magnetic head 13 seek the magnetic disk 11 up to the specific position specified by the address information found in the reading command, and from the specific position, performs reading processing of reading data related to the reading command (S31). At this time, the MPU/HDC 21 determines whether the state is in the reading-difficult state or not (S32: detection step).

Herein, the reading-difficult state denotes the state in which data reading from the magnetic disk 11 takes a predetermined length of time or longer, e.g., the state in which the device temperature detected by the temperature sensor 30 is not satisfying a predetermined temperature range being previously ready. The predetermined temperature range can be set based on the temperature range with which the operation of the magnetic disk device 1 can be assured. With the temperature not falling in the operation assurance range, the thermal expansion and contraction of the magnetic disk 11 and a bearing or others in the spindle motor 12 prevent the magnetic disk 11 from rotating like a perfect circle, thereby resulting in difficulty in positioning the magnetic head 13. As a result, the data writing requires a longer time.

Moreover, the reading-difficult state is not restrictive to such a case due to the temperature but may be the state in which a specific error occurs. Herein, the specific error may be set as a seek error that is occurred when a predetermined value being previously ready is exceeded by the retry frequency and time of the seek operation.

Retrying of the seek operation is performed when the positioning of the magnetic head 13 is difficult because a position error signal (PES) is not reduced sufficiently when the magnetic head 13 is subjected to seeking up to any target track position. Moreover, retrying of the seek operation is also performed when the data read from the magnetic disk 11 after the seek operation is the one read from the position different from the target position, e.g., adjacent track. Also retrying of the seek operation is performed when the data read from the magnetic disk 11 after the seek operation is found out as including some error by an error correction code (ECC) additionally provided to the data.

Next, when detecting the reading-difficult state (S32: YES), the MPU/HDC 21 transmits data related to the reading command read from the magnetic disk 11 to the external host (S33), and records this data related to the reading command into the memory 44 (S34: recording step). At this time, the RAM 43 or the memory 44 is recorded with corresponding information indicating that the data related to the reading command read from the specific position of the magnetic disk 11 specified by the address information found in the reading command is recorded in a predetermined area of the memory 44.

Thereafter, when receiving another reading command for the same data from the external host (S35: YES), the MPU/HDC 21 reads the data from the memory 44 based on the corresponding information for transmission to the external host (S36: transmission step). That is, although this reading command is including the address information same as that of the first reading command, the corresponding information is written with the correlation between the address information and the area recorded with the data of the memory 44. The MPU/HDC 21 thus reads the data from the memory 44 based on this corresponding information for transmission to the external host.

Note here that, when the reading-difficult state is not detected any more, the MPU/HDC 21 deletes the data from the memory 44. Also, the corresponding information is deleted.

As described in the foregoing, when detecting the reading-difficult state during the reading processing, the magnetic disk device 1 records the data that is read from the magnetic disk 11 and is related to the reading command to the memory 44. Thereafter, for another reading command comes for the same data, the device reads the data from the memory 44 for transmission to the external host. As such, in a case where a reading command repeatedly comes for any same data, the data can be supplied swiftly to the side of the external host.

As such, with no involvement of the external host, the magnetic disk device 1 voluntarily records the data that is read from the magnetic disk 11 and is related to the reading command to the memory 44, and then when another reading command comes for any same data, reads the data from the memory 44 for transmission to the external host so that the load on the side of the external host can be reduced.

Embodiments of the present invention are not restricted to the above-described forms. For example, the above embodiments describe an example in which the magnetic disk device 1 is provided with the temperature sensor 30. However, this is not required, and for example, the magnetic disk device 1 may be provided with a vibration sensor, and data may be recorded into the memory 44 by the MPU/HDC 21 detecting any state in which the device vibration to be detected by the vibration sensor is not satisfying a predetermined range as the writing-difficult state or the reading-difficult state.

What is claimed is:

1. A data recording device, comprising:
a main recording medium for recording of data;
an auxiliary recording medium provided separately from the main recording medium;
a detection circuit that detects a reading-difficult state in which reading of the data from the main recording medium takes a predetermined length of time or longer based on a position error signal for a magnetic head; and
a control circuit that reads, when the reading-difficult state is being detected, data related to a reading command from the main recording medium for transmission and recording to the auxiliary recording medium, and then when receiving another reading command for the same data, reads the data recorded on the auxiliary recording medium for transmission.

2. The data recording device according to claim 1, further comprising:
a temperature sensor that detects a device temperature of the data recording device, wherein:
the detection circuit detects a state in which the device temperature detected by the temperature sensor does not satisfy a predetermined temperature range as the reading-difficult state.

3. The data recording device according to claim 1, wherein:
the detection circuit detects a state in which a predetermined error is occurring as the reading-difficult state.

4. The data recording device according to claim 1, wherein:
the main recording medium is configured by a recording disk, and the auxiliary recording medium is configured by a semiconductor memory.

5. The data recording device according to claim 1, wherein:
the detection circuit detects a writing-difficult state in which writing of the data to the main recording medium possibly suffers from trouble, and
the control circuit records, on the auxiliary recording medium, data related to a writing command in a state that the writing-difficult state is being detected.

6. The data recording device according to claim 5, wherein:
the control circuit records, on the main recording medium, the data recorded on the auxiliary recording medium in a state that the writing-difficult state is not detected any more.

7. A data recording device control method, comprising:
a detection step of detecting a reading-difficult state in which reading of data from a main recording medium takes a predetermined length of time or longer;
a recording step of reading, when the reading-difficult state is being detected, data related to a reading command from the main recording medium for transmission and for recording on an auxiliary recording medium provided separately from the main recording medium; and
a reading step of reading, when the reading-difficult state is being detected, when another reading command is received for the same data after the recording step, the data recorded on the auxiliary recording medium for transmission.

8. The method according to claim 7, further comprising:
detecting a device temperature of the data recording device, wherein:
a detection circuit detects a state in which the device temperature detected by a temperature sensor does not satisfy a predetermined temperature range as the reading-difficult state.

9. The method according to claim 7, wherein:
a detection circuit detects a state in which a predetermined error is occurring as the reading-difficult state based on a position error signal of a magnetic head.

10. The method according to claim 7, wherein:
the main recording medium is configured by a recording disk, and the auxiliary recording medium is configured by a semiconductor memory.

11. The method according to claim 7, wherein:
a detection circuit detects a writing-difficult state in which writing of the data to the main recording medium possibly suffers from trouble, and
a control circuit records, on the auxiliary recording medium, data related to a writing command in a state that the writing-difficult state is being detected.

12. The method according to claim 11, wherein:
the control circuit records, on the main recording medium, the data recorded on the auxiliary recording medium in a state that the writing-difficult state is not detected any more.

* * * * *

UNITED STATES PATENT AND TRADEMARK OFFICE
CERTIFICATE OF CORRECTION

| | | |
|---|---|---|
| PATENT NO. | : 7,987,317 B2 | Page 1 of 1 |
| APPLICATION NO. | : 12/006641 | |
| DATED | : July 26, 2011 | |
| INVENTOR(S) | : Akiba Kazuhiko | |

It is certified that error appears in the above-identified patent and that said Letters Patent is hereby corrected as shown below:

On the Title page of the patent, Item (12) should read: Kazuhiko

On the Title page of the patent, please delete "(76) Inventor: Kazuhiko Akiba, Kanagawa (JP)" and insert therefore --(76) Inventor: Akiba Kazuhiko, Kanagawa (JP)--.

Signed and Sealed this
Sixth Day of December, 2011

David J. Kappos
*Director of the United States Patent and Trademark Office*